US012672154B2

(12) United States Patent
Diao et al.

(10) Patent No.: US 12,672,154 B2
(45) Date of Patent: Jun. 30, 2026

(54) MULTICAST BROADCAST SERVICE SESSION ACTIVATION AND DEACTIVATION IN WIRELESS NETWORKS

(71) Applicant: ZTE Corporation, Guangdong (CN)

(72) Inventors: Xueying Diao, Shenzhen (CN); Lin Chen, Shenzhen (CN); Tao Qi, Shenzhen (CN)

(73) Assignee: ZTE Corporation, Shenzhen (CN)

( * ) Notice: Subject to any disclaimer, the term of this patent is extended or adjusted under 35 U.S.C. 154(b) by 243 days.

(21) Appl. No.: 18/352,144

(22) Filed: Jul. 13, 2023

(65) Prior Publication Data

US 2023/0362961 A1     Nov. 9, 2023

Related U.S. Application Data

(63) Continuation of application No. PCT/CN2021/071841, filed on Jan. 14, 2021.

(51) Int. Cl.
  *H04W 4/00*      (2018.01)
  *H04W 72/30*     (2023.01)
  *H04W 76/40*     (2018.01)
(52) U.S. Cl.
  CPC ........... *H04W 72/30* (2023.01); *H04W 76/40* (2018.02)
(58) Field of Classification Search
  USPC .................................................. 370/329, 330
  See application file for complete search history.

(56) References Cited

U.S. PATENT DOCUMENTS

| | | | |
|---|---|---|---|
| 2010/0103853 A1 | 4/2010 | Inoue et al. | |
| 2011/0145387 A1 | 6/2011 | Peng et al. | |
| 2017/0290014 A1 | 10/2017 | Kim et al. | |
| 2023/0026061 A1* | 1/2023 | Liu | ........................ H04W 48/16 |
| 2023/0053835 A1* | 2/2023 | Byun | ...................... H04W 4/06 |
| 2023/0262533 A1* | 8/2023 | Fujishiro | ............... H04W 28/04 370/312 |
| 2023/0319909 A1* | 10/2023 | Dai | ........................ H04W 76/40 370/329 |
| 2024/0023191 A1* | 1/2024 | Dai | ........................ H04W 76/27 |
| 2025/0168601 A1* | 5/2025 | Chen | ................. H04W 36/0007 |

FOREIGN PATENT DOCUMENTS

| | | |
|---|---|---|
| CN | 111406391 A | 7/2020 |
| CN | 111491346 A | 8/2020 |
| CN | 111602452 A | 8/2020 |
| CN | 111866755 A | 10/2020 |

OTHER PUBLICATIONS

Huawei et al., "KI#1: New Solution for MBS Session (activate, deactivate)", 3GPP TSG-WG SA2 Meeting #140E e-meeting, S2-2005482, Sep. 1, 2020, Elbonia (5 pages).
(Continued)

*Primary Examiner* — Chuong T Ho
(74) *Attorney, Agent, or Firm* — Foley & Lardner LLP

(57)     ABSTRACT

Techniques relating to a multicast broadcast service are described. In one example aspect, the method includes receiving, by a first network node, from a second network node, a third information, and transmitting, by the first network node, a fourth information associated with one or more multicast broadcast service (MBS) sessions.

18 Claims, 5 Drawing Sheets

100

(56) References Cited

OTHER PUBLICATIONS

International Search Report and Written Opinion for PCT Appl. No. PCT/CN2021/071841, mailed Sep. 28, 2021 (7 pages).

OPPO, "MBS_Solution for session deactivation and activation", SA WG2 Meeting #S2-139E, S2-2003857, Electronic, Elbonia, Jun. 12, 2020 (5 pages).

CATT, "Consideration on MBS context management over F1 and E1", 3GPP TSG-RAN WG3 #110 electronic, R3-206835, Nov. 12, 2020, Online (15 pages).

Extended European Search Report for EP Appl. No. 21918404.1, dated Jan. 19, 2024 (10 pages).

First Office Action for CN Appl. No. 202180090784.X, dated Apr. 15, 2026 (with English translation, 24 pages).

* cited by examiner

100

200

220

205

215

Transceiver Electronics

210

Processor Electronics

Figure 4:
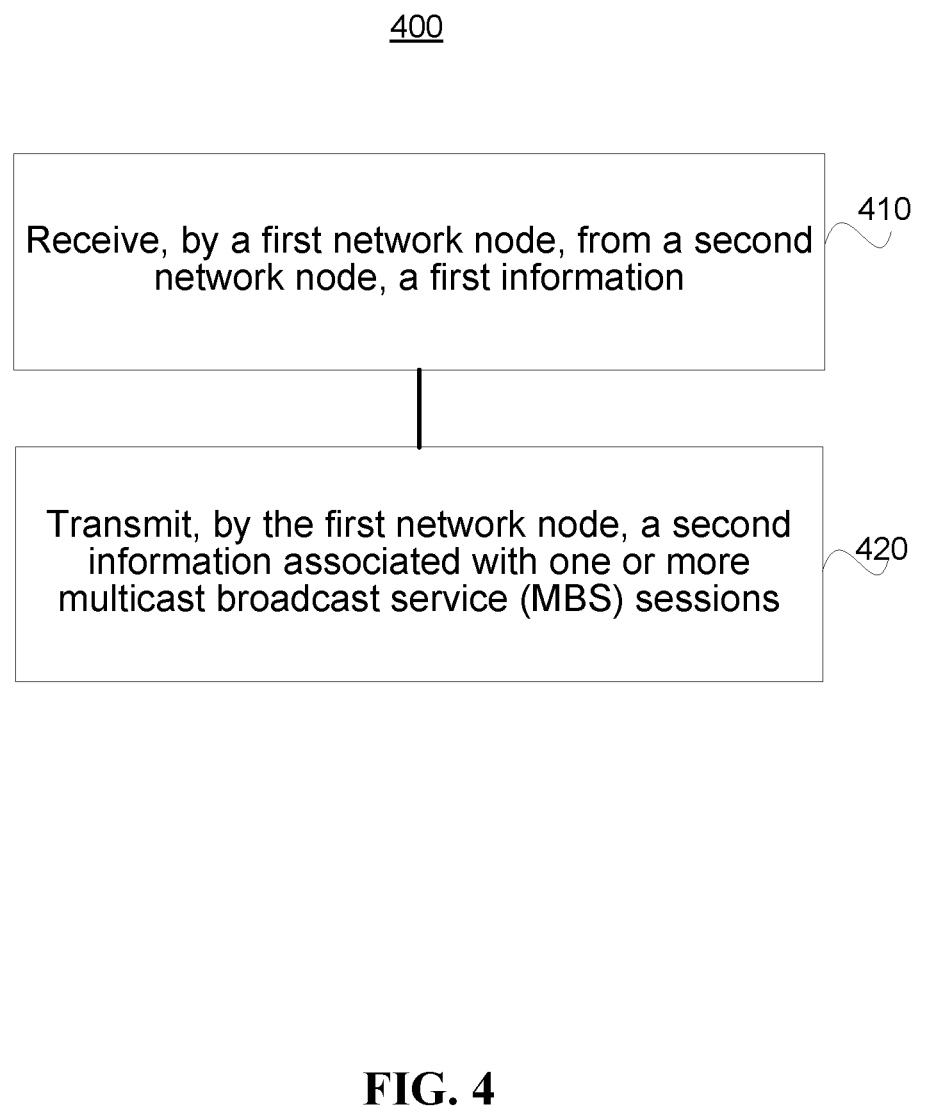

400

Receive, by a first network node, from a second
network node, a first information                           410

Transmit, by the first network node, a second
information associated with one or more                     420
multicast broadcast service (MBS) sessions

Receive, by a first network node, from a second network node, a third information  510

Transmit, by the first network node, a fourth information associated with one or more multicast broadcast service (MBS) sessions  520

MULTICAST BROADCAST SERVICE SESSION ACTIVATION AND DEACTIVATION IN WIRELESS NETWORKS

CROSS-REFERENCE TO RELATED APPLICATION

This application claims the benefit of priority under 35 U.S.C. § 120 as a continuation of PCT Patent Application No. PCT/CN2021/071841, filed on Jan. 14, 2021, the disclosure of which is incorporated herein by reference in its entirety.

TECHNICAL FIELD

This patent document is directed generally to wireless communications.

BACKGROUND

Mobile communication technologies are moving the world toward an increasingly connected and networked society. The rapid growth of mobile communications and advances in technology have led to greater demand for capacity and connectivity. Other aspects, such as energy consumption, device cost, spectral efficiency, and latency are also important to meeting the needs of various communication scenarios. Various techniques, including new ways to provide higher quality of service, longer battery life, and improved performance are being discussed.

SUMMARY

In one aspect, a method of data communication is disclosed. The method includes receiving, by a first network node, from a second network node, a first information, and transmitting, by the first network node, a second information associated with one or more multicast broadcast service (MBS) sessions.

In another aspect, a method of data communication is disclosed. The method includes receiving, by a first network node, from a second network node, a third information, and transmitting, by the first network node, a fourth information associated with one or more multicast broadcast service (MBS) sessions.

In another example aspect, a wireless communication apparatus comprising a processor configured to implement an above-described method is disclosed.

In another example aspect, a computer storage medium having code for implementing an above-described method stored thereon is disclosed.

These, and other, aspects are described in the present document.

BRIEF DESCRIPTION OF DRAWINGS

FIG. 4 shows an example of a process for wireless communication based on some example embodiments of the disclosed technology.

DETAILED DESCRIPTION

Certain features are described using the example of Fifth Generation (5G) wireless protocol. However, applicability of the disclosed techniques is not limited to only 5G wireless systems.

5G systems (5GS) include multicast/broadcast services. An aspect of these services is multicast discovery and the starting and ending of multicast services. User equipment (UEs) may simultaneously operate using unicast (also referred to as unicast) and multicast services. When a UE moves from one radio access network (RAN) node to another RAN node, service continuity of the broadcast and multicast services is needed. Disclosed herein are techniques for providing continuity of service for broadcast and multicast services.

In some example embodiments, a multicast service is a communications service in which the same service and the same content data are provided simultaneously to a set of authorized UEs (i.e., not all UEs in the multicast coverage are authorized to receive the data). A broadcast service is a communications service in which the same service and the same content data are provided simultaneously to all UEs in a geographical area (i.e., all UEs in the broadcast coverage area are authorized to receive the data).

Figure 1:
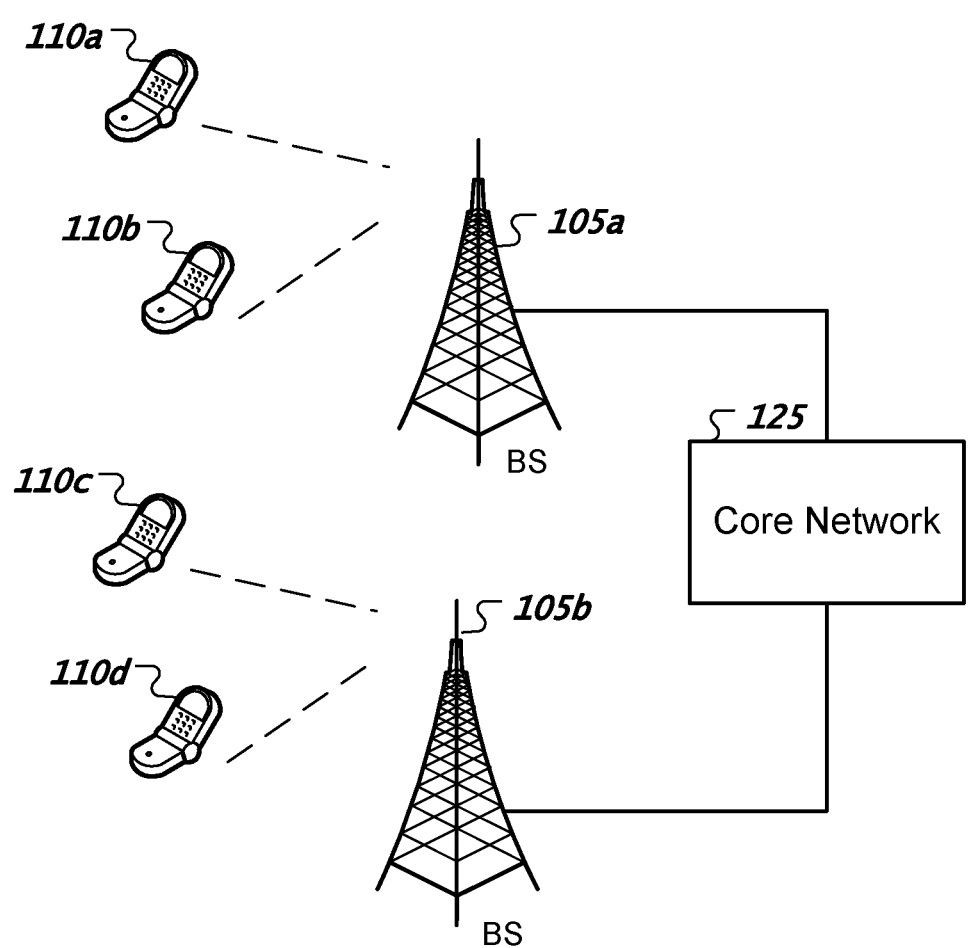
FIG. 1 shows a wireless communication system based on some example embodiments of the disclosed technology.

FIG. 1 shows an example of a wireless communication system 100 where techniques in accordance with one or more embodiments of the present technology can be applied. A wireless communication system 100 can include one or more base stations (BSs) 105a, 105b, one or more wireless devices 110a, 110b, 110c, 110d, and a core network 125. A base station 105a, 105b can provide wireless service to wireless devices 110a, 110b, 110c and 110d in one or more wireless sectors. In some implementations, a base station 105a, 105b includes directional antennas to produce two or more directional beams to provide wireless coverage in different sectors.

The core network 125 can communicate with one or more base stations 105a, 105b. The core network 125 provides connectivity with other wireless communication systems and wired communication systems. The core network may include one or more service subscription databases to store information related to the subscribed wireless devices 110a, 110b, 110c, and 110d. A first base station 105a can provide wireless service based on a first radio access technology, whereas a second base station 105b can provide wireless service based on a second radio access technology. The base stations 105a and 105b may be co-located or may be separately installed in the field according to the deployment scenario. The wireless devices 110a, 110b, 110c, and 1210d can support multiple different radio access technologies. The techniques and embodiments described in the present document may be implemented by the base stations of wireless devices described in the present document.

Figure 2:
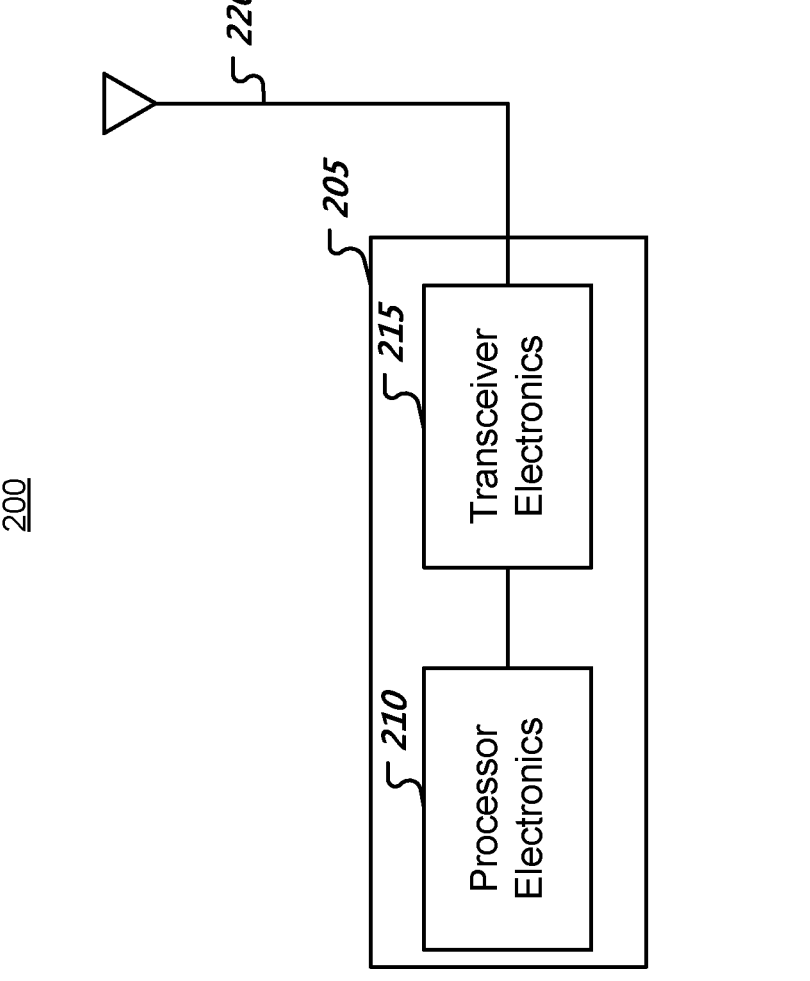
FIG. 2 shows a block diagram of a portion of a radio system based on some example embodiments of the disclosed technology.

FIG. 2 is a block diagram representation of a portion of a radio station in accordance with one or more embodiments of the present technology can be applied. A radio 205 such as a base station or a wireless device (or UE) can include processor electronics 210 such as a microprocessor that implements one or more of the wireless techniques presented in this document. The radio 205 can include transceiver electronics 215 to send and/or receive wireless signals over one or more communication interfaces such as antenna 220. The radio 205 can include other communication interfaces for transmitting and receiving data. Radio 205 can include one or more memories (not explicitly shown) configured to store information such as data and/or instructions. In some implementations, the processor electronics 210 can include at least a portion of the transceiver electronics 215. In some embodiments, at least some of the disclosed techniques, modules or functions are implemented using the radio 205. In some embodiments, the radio 205 may be configured to perform the methods described in this document. The network node described in the present application may be implemented using the above-described radio station or by using a hardware platform that includes a combination of one or more processors, one or more network interface hardware and one or more memories for storing processor-executable code or data.

With the continuous development of 5G (5th generation mobile networks, the fifth generation of mobile communication technology), 5G solutions for various application scenarios are accelerating the integration. The multicast broadcast service scenario is a traditional service scenario that exists to meet the needs of most users for the same service. Currently, the 5G-related technologies that have been discussed and standardized in the industry are mainly about unicast business scenarios, that is, the PTP (Point to Point) service model. With the rapid growth of the number of users and the multi-dimensional application scenarios, the point-to-multipoint business model such as the multicast broadcast service (MBS) will become one of the most important service models. In the multicast broadcast scenario, the base station will deactivate or activate some MBS services based on the service priority, resource utilization, and user nodes. However, how to activate and deactivate MBS services has not been discussed for base stations, especially base stations with CU (Centralized Unit, centralized network element)/DU (Distributed Unit, distributed network element) separation and CP (Control Plane)/UP (User Plane) separation.

In this patent document, the terms "deactivation or suspension indication," "deactivation indication," and "suspension indication" can be used to indicate any message or information that indicates "deactivation" or "suspension" of MBS session. Similarly, the term "activation indication" can be used to indicate any message or information that indicates "activation" or "resumption" of MBS session.

In some embodiments of the disclosed technology, MBS session can be deactivated because no downlink (DL) data has arrived at CU-UP for a long time.

Step 0: CU-UP is configured with an inactivity timer. At the CU-UP, all the MBS sessions use the same inactivity timer configuration. In an implementation, the inactivity timer configuration is per MBS session. In another implementation, CU-CP receives several sets of inactivity timer configuration. In another implementation, CU-CP receives one or more MBS session identities for each set of inactivity timer configuration.

In another implementation, the inactivity timer can be configured by CU-CP. CU-CP sends the configuration to CU-UP via E1AP (E1 Application Protocol) message.

In another implementation, the inactivity timer is configured by 5GC. In one example, 5GC sends the configuration to CU-CP via NGAP (NG Application Protocol) message, and CU-CP forwards the configuration to CU-UP via E1AP message.

Step 1: Upon detecting the inactivity timer expires, CU-UP sends CU-CP the MBS session information whose inactivity timer expires, e.g., MBS session ID or protocol data unit (PDU) session ID or an indication about the expiration of an inactivity timer associated with an MBS session.

Step 2: Upon receiving the expiration of the inactivity timer from CU-UP, CU-CP determines whether to deactivate the MBS session.

Step 3: If the MBS session is not deactivated, CU-CP may send the following information to CU-UP via E1AP message:

In an implementation, CU-CP may send an indication to tell CU-UP that the MBS session is not deactivated. Then CU-UP may ignore the expired inactivity timer or re-start the inactivity timer.

In another implementation, CU-CP may send an indication to request CU-UP to ignore the expired inactivity timer.

In another implementation, CU-CP may send an indication to request CU-UP to re-start the expired inactivity timer.

In another implementation, CU-CP may send the information about when to deactivate the MBS session, e.g., after a few seconds, the MBS session should be deactivated.

Step 4: If the MBS session is deactivated, CU-CP may keep the F1 UL TEID or F1 DL TEID or F1 UL Transport Layer Address or F1 DL Transport Layer Address.

Step 4-1: CU-CP may send CU-UP the identity of the MBS session to be deactivated, e.g., MBS session ID or PDU session ID or a temporary mobile group identity (TMGI), and a deactivation indication which is used to inform CU-UP of the deactivation of the MBS session. The CU-UP sends a message to CU-CP including the PDCP DL status that may be needed for data volume reporting for example. The CU-UP keeps the multicast resource bearer (MRB) Context, the logical E1-connection, the NG-U related resource (e.g., NG-U DL TEIDs). CU-UP may keep the F1 UL TEID or F1 DL TEID or F1 UL Transport Layer Addressor F1 DL Transport Layer Address.

Step 4-2: CU-CP may send DU the following information:

In an implementation, CU-CP may send the identity of the MBS session to be deactivated, e.g., TMGI.

In another implementation, CU-CP may send a deactivate or suspend indication for the MBS session.

In another implementation, CU-CP may send the identities of MRBs associated with the MBS session to be deactivated.

In another implementation, CU-CP may send a deactivate or suspend indication for the MRB.

In another implementation, CP may send an RRC container which contains an RRC message. The RRC message may include the following information:

In another implementation, the RRC message may include the identity of the MBS session to be deactivated, e.g. TMGI.

In another implementation, the RRC message may include a deactivation or suspension indication for the MBS session.

In another implementation, the RRC message may include the identities of MRBs associated with the MBS session to be deactivated.

In another implementation, the RRC message may include a deactivate or suspension indication for the MRB.

In another implementation, CU-CP may send an indication to DU, which is used for indicating DU to keep context and configuration related to the MBS session to be deactivated.

Step 4-2-1: DU may keep all the context or configuration related to the MBS session or MBS bearer, e.g., TMGI, MRB ID, MRB QoS info, QoS flow parameters, RLC mode, optional group member information (including UE ID, or an index, or RNTI), LCID and F1 UL/DL UP TNL Information.

In some implementations, DU may generate a medium access control layer control element (MAC CE) to inform UE of the deactivated logical channel. In another implementation, DU may send the deactivated MBS session identity, e.g., TMGI, or a deactivation indication, via System Information Block (SIB) or MCCH. If an RRC Container is received from CU, the DU shall send the RRC container to the UE.

Step 4-2-2: Upon knowing the deactivation of the MBS session or MRB, DU may totally release the context associated to the MBS session or MRB based on an implementation.

In another implementation, DU may release the context associated to the MBS session or MRB except TMGI, MRB ID, MRB QoS info, QoS flow parameters, RLC mode, optional group member information (including UE ID, or an index, or RNTI), LCID and F1 UL UP TNL Information.

In another implementation, DU may only release UM mode RLC entities for the MRB to be deactivated. This is because the UM RLC entity is only used for DL MBS data transfer.

In another implementation, DU may only release the logical channel corresponding to PTM transmission.

If an RRC Container is received from CU, the DU shall send the RRC container to the UE.

In some implementations, Step 4-1, 4-2 may be performed in parallel.

Step 4-3: Upon knowing the deactivation of an MBS session or an MRB, UE may not monitor the MBS session identity. In an implementation, UE may cancel all pending SR(s) only related to the MBS session, or cancel all triggered BSRs which are only related to the MBS session, or release RLC entities related to the MBS session or MRB.

In another implementation, UE may release UM mode RLC entities for the MRB to be deactivated.

In another implementation, UE may release the logical channel corresponding to PTM transmission.

In another implementation, UE may suspend PDCP. Alternatively, PDCP entity is delayed to suspend until all the UL packets are received.

In another implementation, UE may indicate PDCP suspend to lower layers of related MRBs, or indicate the suspension of MBS session to upper layers.

Step 4-4: CU-CP sends 5GC information discussed below.

In an implementation, CU-CP sends 5GC the identity of the MBS session to be deactivated, e.g. MBS session ID or PDU session ID or TMGI.

In another implementation, CU-CP sends 5GC deactivation indication, the indication may be associated with the MBS session to be deactivated.

In another implementation, CU-CP sends 5GC a cause which reflects the cause of deactivating the MBS session, e.g., an inactivity timer expiration.

In some embodiments of the disclosed technology, MBS session can be activated upon arrival of DL data at CU-UP.

Step 1: Upon detecting the DL data arrival, CU-UP sends CU-CP MBS session ID or PDU session ID, or information about the arrival of the DL data.

Step 2: Upon receiving the data arrival indication from CU-UP, CU-CP determines to activate the MBS session.

Step 3: CU-CP sends information about the MBS session to be activated to DU:

In an implementation, the information includes MBS session identity, e.g., TMGI.

In another implementation, the information includes an activation indication for the MBS session.

In another implementation, the information includes the identities of MRBs associated with the MBS session to be activated.

In another implementation, the information includes an activation indication for the MRB.

In another implementation, the information includes the UL TNL or UL TEID information for the MRB.

In some implementations, CP may send DU an RRC container which contains an RRC message. The RRC message may include the following:

In an implementation, the RRC message includes the identity of the MBS session to be activated, e.g. TMGI.

In another implementation, the RRC message includes an activation indication for the MBS session.

In another implementation, the RRC message includes the identities of MRBs associated with the MBS session to be activated.

In another implementation, the RRC message includes an activate indication for the MRB.

Step 3-1: DU may generate MAC CE to inform UE of the activated logical channel, where the MAC CE includes the LCID of the activated LCH. Alternatively, it just generates a MAC CE used to inform UE of the deactivated logical channel. After receiving such an MAC CE, since the LCID of the reactivated LCH is not included in the MAC CE, UE can know the LCH which was deactivated is now reactivated. In another implementation, DU may broadcast the activated MBS session information, e.g., TMGI, via System Information Block (SIB)/MCCH. If an RRC Container is received from CU, the DU sends the RRC container to the UE.

If a lower layer configuration is modified, DU sends the modified configuration to CU-CP.

Step 3-2: DU may establish the following.

In another implementation, new MRBs according to the stored configuration.

In another implementation, UM mode radio link control (RLC) entity for the MRB to be activated, and response CU-CP with LCID or the F1-U DL TEID or TNL address.

In another implementation, the logical channel corresponding to PTM mode transmission, and response CU-CP with LCID.

Step 4: The gNB-CU-CP sends a message to CU-UP including the identity of the MBS session to be activated, e.g., MBS session ID or PDU session ID or TMGI, or an activation indication which is used to inform CU-UP of the activation of the MBS session, or the DL TNL information for the related MRB(s).

Step 5: upon knowing the activated MBS session, UE may resume monitoring the TMGI, or apply DRX, or monitor MCCH or SIB. UE resumes related MRBs, or indicate the suspended MBS session is resumed to upper layers.

Step 6: CU-CP sends 5GC the following information.

In an implementation, MBS session identity of the MBS session to be activated.

In another implementation, activation indication for the MBS session.

In some embodiments of the disclosed technology, MBS session can be deactivated because no DL data has arrived at CU-UP for a long time, where CU-UP determines whether to deactivate MBS session(s).

Step 0: CU-UP is configured with an inactivity timer. At the CU-UP, all the MBS sessions use the same inactivity timer configurations. In another implementation, different MBS sessions may have different inactivity timer configurations. In another implementation, CU-CP receives several sets of inactivity timer configuration. In another implementation, CU-CP receives one or more MBS session identities for each set of inactivity timer configuration.

In an implementation, the inactivity timer can be configured by CU-CP. In one example, CU-CP sends the configuration to CU-UP via E1AP message.

In another implementation, the inactivity timer is configured by 5GC. In one example, 5GC sends the configuration to CU-CP via NGAP message, and CU-CP forwards the configuration to CU-UP via E1AP message.

Step 1: Upon detecting the expiration of the inactivity timer, CU-UP determines to deactivate MBS session(s), and then it sends CU-CP the identity of the MBS session to be deactivated, e.g., MBS session ID or PDU session ID or TMGI, an indication about the expiration of an inactivity timer, or a deactivation indication, which is used to inform CU-CP of the deactivation of the MBS session. The CU-UP sends a message to CU-CP including the PDCP DL status that may be needed for, e.g., data volume reporting. The CU-UP keeps the MRB Context, the logical E1-connection, the NG-U related resource (e.g., NG-U DL TEIDs). CU-UP may keep the F1 UL TEID or F1 DL TEID or F1 UL Transport Layer Address or F1 DL Transport Layer Address.

Step 2: upon receiving the message from CU-UP, CU-CP may keep the F1 UL TEID or F1 DL TEID or F1 UL Transport Layer Address or F1 DL Transport Layer Address.

Step 3: CU-CP may send the following information to DU: the identity of the MBS session to be deactivated, e.g., TMGI; a deactivate or suspension indication for the MBS session; the identity of MRB associated with the MBS session to be deactivated; a deactivate or suspension indication for the MRB; an RRC container which contains an RRC message.

The RRC message may include the following information:

In an implementation, the RRC message may include the identity of the MBS session to be deactivated, e.g. TMGI.

In another implementation, the RRC message may include a deactivate or suspension indication for the MBS session.

In another implementation, the RRC message may include the identities of MRBs associated with the MBS session to be deactivated.

In another implementation, the RRC message may include a deactivate or suspension indication for the MRB.

In some implementations, CU-CP may send an indication to DU, which is used for DU to keep context and configuration related to the MBS session to be deactivated.

Step 3-1: DU may keep all the context and configuration related to the MBS session/MBS bearer, e.g., TMGI, MRB ID, MRB QoS info, QoS flow parameters, RLC mode, optional group member information (including UE ID, or an index, or RNTI), LCID and F1 UL/DL UP TNL Information.

DU may generate a MAC CE to inform UE of the deactivated logical channel. DU may broadcast the deactivated MBS session information, e.g., TMGI, via System Information Block (SIB) or MCCH. If an RRC Container is received from CU, the DU sends the RRC container to the UE.

Step 3-2: Upon knowing the deactivation of the MBS session or MRB, DU may release the following.

In an implementation, DU may totally release the context associated to the MBS session or MRB.

In another implementation, DU may release the context associated to the MBS session or MRB except TMGI, MRB ID, MRB QoS info, QoS flow parameters, RLC mode, optional group member information (including UE ID, or an index, or RNTI), LCID and F1 UL UP TNL Information.

In another implementation, DU may only release UM mode RLC entities for the MRB to be deactivated. This is because the UM RLC entity is only used for DL MBS data transfer.

In another implementation, DU may only release the logical channel corresponding to PTM transmission.

If an RRC Container is received from CU, the DU sends the RRC container to the UE.

Step 4: Upon knowing the deactivation of an MBS session or an MRB, UE may not monitor the MBS session identity, and may perform the following.

In an implementation, UE may cancel all pending SR(s) only related to the MBS session, or cancel all triggered BSRs which are only related to the MBS session, delete the MAC Cell Group configuration or release RLC entities related to the MBS session or MRB.

In another implementation, UE may release UM mode RLC entities for the MRB to be deactivated.

In another implementation, UE may release the logical channel corresponding to PTM transmission.

In another implementation, UE may suspend PDCP. Alternatively, PDCP entity is delayed or suspended until all the UL packets are received.

In another implementation, UE may indicate that PDCP is suspended to lower layers of related MRBs, or indicate the suspension of MBS session, to upper layers.

Step 5: CU-CP sends 5GC the following information.

In an implementation, CU-CP sends the identity of the MBS session to be deactivated, e.g., MBS session ID or PDU session ID or TMGI.

In another implementation, CU-CP sends a deactivation indication, and the indication may be associated with the MBS session to be deactivated.

In another implementation, CU-CP sends a cause which reflects the cause of deactivating the MBS session, e.g., an inactivity timer expiration.

In some embodiments of the disclosed technology, MBS session can be activated upon arrival of DL data at CU-UP, where CU-UP determines the activation of MBS session.

Step 1: Upon detecting the DL data arrival, CU-UP sends CU-CP a message including the identity of the MBS session to be activated, e.g., MBS session ID or PDU session ID or TMGI, or an indication about the DL data arrival, or an activation indication which is used to inform CU-CP of the activation of the MBS session.

Step 2: upon receiving the message from CU-UP, CU-CP sends the information about the MBS session to be activated to DU.

In an implementation, the information includes MBS session identity, e.g. TMGI.

In another implementation, the information includes an activation indication for the MBS session.

In another implementation, the information includes MRB identity.

In another implementation, the information includes an activation indication for the MRB.

In another implementation, the information includes the UL TNL/TEID information for the related MRB.

In some implementations, CP may send DU an RRC container which contains an RRC message.

In an implementation, the RRC message may include the identity of the MBS session to be activated, e.g. TMGI.

In another implementation, the RRC message may include an activate indication for the MBS session.

In another implementation, the RRC message may include the identity of MRBs associated with the MBS session to be activated.

In another implementation, the RRC message may include an activate indication for the MRB.

Step 3-1: DU may generate MAC CE to inform UE of the activated logical channel, where the MAC CE includes the LCID of the activated LCH. Alternatively, it may remove the LCID of the in-deactivated LCH from the MAC CE, where the MAC CE includes the LCID of the deactivated LCH, and thus UE can recognize the re-activated LCH. In another implementation, DU may broadcast the activated MBS session, e.g., TMGI, via System Information Block (SIB)/MCCH. If an RRC Container is received from CU, the DU shall send the RRC container to the UE.

If a lower layer configuration is modified, DU sends the modified configuration to CU-CP.

Step 3-2: DU may establish the following.

In an implementation, DU may establish new MRB according to the stored configuration.

In another implementation, DU may establish UM mode RLC entities for the MRB to be activated, and response CU-CP with LCIDs and the F1-U DL TEIDs and/or TNL addresses.

In another implementation, DU may establish the logical channel corresponding to PTM (DL), and response CU-CP with LCIDs.

Step 4: The gNB-CU-CP may send a message to CU-UP including the DL TNL information for the related MRBs.

Step 5: upon knowing the re-activated MBS session, UE may resume monitoring the TMGI, apply DRX, monitor MCCH/SIB. UE resumes related MRBs, and optionally indicates the suspended MBS session is resumed to upper layers.

Step 6: CU-CP sends 5GC the following information.

In an implementation, CU-CP sends MBS session ID or PDU session ID

In another implementation, CU-CP sends an activation indication.

In some embodiments of the disclosed technology, MBS session can be deactivated according to CU-CP decision, e.g., ARP or counting.

Step 1: CU-CP determines to deactivate MBS session(s).

Step 2: CU-CP may keep the F1 UL TEIDs and/or F1 DL TEIDs and/or F1 UL Transport Layer Addresses and/or F1 DL Transport Layer Addresses.

Step 3: CU-CP may send CU-UP the identity of the MBS session to be deactivated, e.g., MBS session ID or PDU session ID or TMGI, and a deactivation indication which is used to inform CU-UP of the deactivation of the MBS session. The CU-UP sends a message to CU-CP including the PDCP DL status that may be needed for, e.g., data volume reporting. The CU-UP keeps the MRB Context, the logical E1-connection, the NG-U related resource (e.g., NG-U DL TEIDs). CU-UP may keep the F1 UL TEIDs and/or F1 DL TEIDs and/or F1 UL Transport Layer Addresses and/or F1 DL Transport Layer Addresses.

Step 4: CU-CP may send DU the following information.

In an implementation, CU-CP may send the identity of the MBS session to be deactivated, e.g. TMGI.

In another implementation, CU-CP may send a deactivate or suspension indication for the MBS session.

In another implementation, CU-CP may send the identity of MRBs associated with the MBS session to be deactivated.

In another implementation, CU-CP may send a deactivate or suspension indication for the MRB.

In some implementations, CP may send DU an RRC container which contains an RRC message.

In an implementation, the RRC message may include the identity of the MBS session to be deactivated, e.g., TMGI.

In an implementation, the RRC message may include a deactivate or suspension indication for the MBS session.

In an implementation, the RRC message may include the identity of MRBs associated with the MBS session to be deactivated.

In an implementation, the RRC message may include a deactivate or suspension indication for the MRB.

In some implementations, CU-CP may send an indication to DU, which is used for DU to keep context and configuration related to the MBS session to be deactivated.

Step 4-1: DU may keep all the context and configuration related to the MBS session/MBS bearer, e.g., TMGI, MRB ID, MRB QoS info, QoS flow parameters, RLC mode, optional group member information (including UE ID, or an index, or RNTI), LCID and F1 UL/DL UP TNL Information.

DU may generate a MAC CE to inform UE of the deactivated logical channel. DU may broadcast the deactivated MBS session information, e.g., TMGI, via System Information Block (SIB) or MCCH. If an RRC Container is received from CU, the DU shall send the RRC container to the UE.

Step 4-2: Upon knowing the deactivation of the MBS session or MRB, DU may release the following.

In an implementation, DU may totally release the context associated to the MBS session or MRB.

In another implementation, DU may release the context associated to the MBS session or MRB except TMGI, MRB ID, MRB QoS info, QoS flow parameters, RLC mode, optional group member information (including UE ID, or an index, or RNTI), LCID and F1 UL UP TNL Information.

In another implementation, DU may only release UM mode RLC entities for the MRB to be deactivated. This is because the UM RLC entity is only used for DL MBS data transfer.

In another implementation, DU may only release the logical channel corresponding to PTM (DL).

If an RRC Container is received from CU, the DU sends the RRC container to the UE.

In some implementations, Step 3 and Step 4 may be performed in parallel.

Step 5: Upon knowing the deactivation of an MBS session or an MRB, UE may not monitor the TMGI, and may perform the following operations.

In an implementation, UE may cancel all pending SR(s) only related to the MBS session, cancel all triggered BSRs which are only related to the MBS session, delete the MAC Cell Group configuration and release RLC entities related to the MBS session or MRB.

In another implementation, UE may release UM mode RLC entities for the MRB to be deactivated.

In another implementation, UE may release the logical channel corresponding to PTM (DL).

In another implementation, UE may suspend PDCP. Alternatively, PDCP entity is delayed or suspended until all the UL packets are received.

In another implementation, UE may indicate that PDCP is suspended, to lower layers of related MRBs, and optionally indicate the suspension of MBS session, to upper layers.

Step 6: CU-CP sends 5GC the following information.

In an implementation, CU-CP sends MBS session ID or PDU session ID

In another implementation, CU-CP sends a deactivation indication, and the indication may reflect the cause of deactivating the MBS session, e.g., ARP or counting.

In some embodiments of the disclosed technology, MBS session can be reactivated according to CP decision, e.g., ARP or counting.

Step 1: CU-CP determines to activate MBS session(s).

Step 2: CU-CP sends the information about the MBS session to be activated to DU.

In an implementation, the information includes MBS session identity, e.g., TMGI.

In another implementation, the information includes an activation indication for the MBS session.

In another implementation, the information includes MRB identity.

In another implementation, the information includes an activation indication for the MRB.

In another implementation, the information includes the UL TNL/TEID information for the related MRB.

In some implementations, CP may send DU an RRC container which contains an RRC message.

In an implementation, the RRC message may include the identity of the MBS session to be activated, e.g. TMGI.

In another implementation, the RRC message may include an activate indication for the MBS session.

In another implementation, the RRC message may include the identity of MRBs associated with the MBS session to be activated.

In another implementation, the RRC message may include an activate indication for the MRB.

Step 2-1: DU may generate MAC CE to inform UE of the activated logical channel, where the MAC CE includes the LCID of the activated LCH. Alternatively, it may remove the LCID of the in-deactivated LCH from the MAC CE, where the MAC CE includes the LCID of the deactivated LCH, and thus UE can recognize the re-activated LCH. In another implementation, DU may broadcast the activated MBS session, e.g., TMGI, via System Information Block (SIB)/ MCCH. If an RRC Container is received from CU, the DU shall send the RRC container to the UE.

If a lower layer configuration is modified, DU sends the modified configuration to CU-CP.

Step 2-2: DU may establish the following.

In an implementation, DU may establish new MRB according to the stored configuration.

In another implementation, DU may establish UM mode RLC entities for the MRB to be activated, and response CU-CP with LCIDs and the F1-U DL TEIDs and/or TNL addresses.

In another implementation, DU may establish the logical channel corresponding to PTM (DL), and response CU-CP with LCIDs.

Step 3: The gNB-CU-CP sends a message to CU-UP including the identity of the MBS session to be activated, e.g. MBS session ID or PDU session ID or TMGI, and an activation indication which is used to inform CU-UP of the activation of the MBS session, and optional together with the DL TNL information for the related MRB.

Step 4: upon knowing the re-activated MBS session, UE may resume monitoring the TMGI, apply DRX, monitor MCCH/SIB. UE resumes related MRBs, and optionally indicate the suspended MBS session is resumed to upper layers.

Step 5: CU-CP sends 5GC the following information.

In an implementation, CU-CP sends MBS session ID or PDU session ID

In another implementation, CU-CP sends an activation indication.

In some embodiments of the disclosed technology, MBS session can be deactivated or activated, where the determination is made by 5GC.

Deactivation

CU-CP may send 5GC the identity of an MBS session, or an indication. The indication may reflect the inactivity timer for the MBS session is expired, or the case that CU-CP wants to deactivate the MBS session.

Upon receiving the message from CU-CP, 5GC determines to deactivate the MBS session. 5GC sends CU-CP the MBS session identity, e.g. TMGI, or a deactivation indication for the MBS session.

Activation

CU-CP may send 5GC the identity of an MBS session, or an indication. The indication may reflect the case that CU-CP wants to activate the MBS session.

Upon receiving the message from CU-CP, 5GC determines to activate the MBS session. 5GC sends CU-CP the MBS session identity, e.g., TMGI, or an activation indication for the MBS session.

Figure 3:
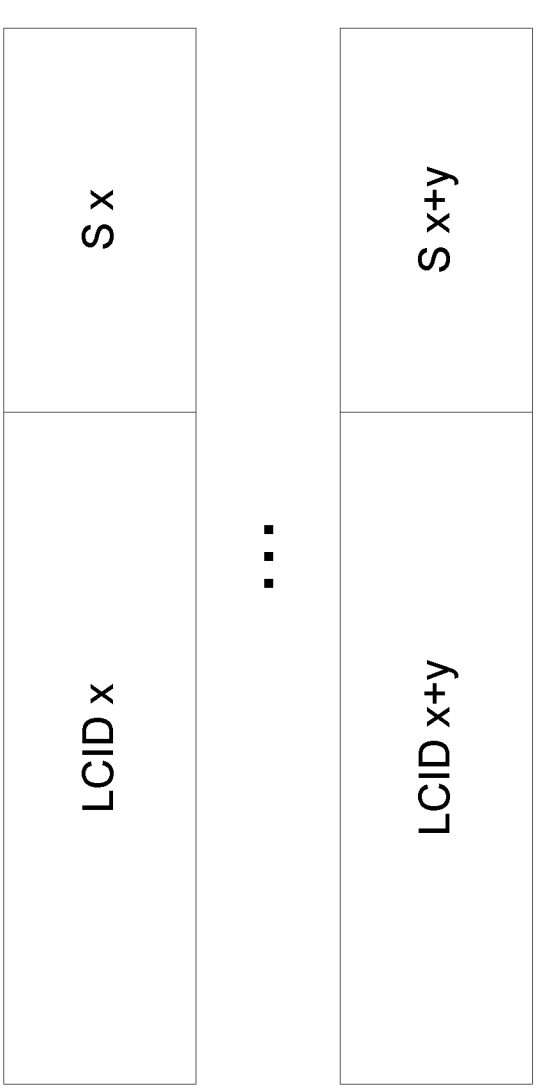
FIG. 3 shows an example of a format of a medium access control (MAC) Control Element CE.

FIG. 3 shows an example of a format of a medium access control (MAC) Control Element CE.

In some implementations, CU-CP informs 5GC of its capability as to whether MBS session deactivation is supported. In some implementations, DU reports, to CU-CP, its capability as to whether MBS session deactivation is supported. In some implementations, DU reports, to CU-CP, its capability as to whether a deactivation of a multicast resource bearer (MRB) is supported.

In some implementations, CU-CP informs 5GC of its capability as to whether MBS session activation is supported. In some implementations, DU reports, to CU-CP, its capability as to whether MBS session activation is supported. In some implementations, DU reports, to CU-CP, its capability as to whether an activation of a multicast resource bearer (MRB) is supported.

In some implementations, 5GC sends CU-CP a list including the MBS sessions capable of being activated. In some implementations, 5GC sends CU-CP a list including the MBS sessions capable of being deactivated.

In some implementations, CU-CP sends CU-UP a list including the MBS sessions capable of being activated. In some implementations, 5GC sends CU-CP a list including the MBS sessions capable of being deactivated.

The MAC control element used to inform UE of the activation/deactivation of an MBS session is identified by a MAC PDU sub-header with LCID as specified in below. This control element has a variable size.

In some implementations, the fields below are included:

(1) LCID: this field indicates the Logical Channel ID. LCIDs x . . . x+y shall be equal to ora subset of the LCIDs 1 . . . n;

(2) S: this field indicates that the transmission of the corresponding LCH is to be deactivated.

In another implementation, the S field can indicate the LCH to be activated.

FIG. 4 shows an example method 400 for wireless communication based on some example embodiments of the disclosed technology. At 410, the method includes receiving, by a first network node, from a second network node, a first information. At 420, the method includes transmitting, by the first network node, a second information associated with one or more multicast broadcast service (MBS) sessions.

Figure 5:
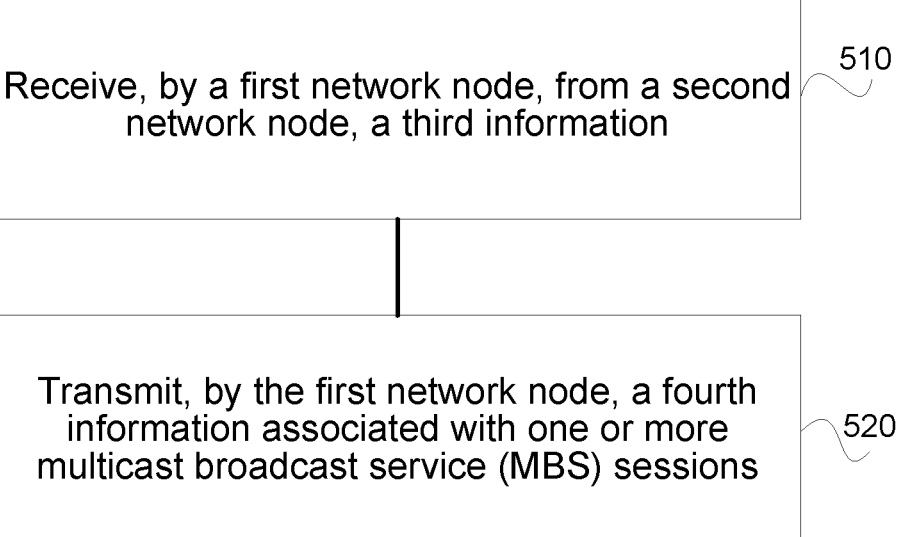
FIG. 5 shows another example of a process for wireless communication based on some example embodiments of the disclosed technology.

FIG. 5 shows another example method 500 for wireless communication based on some example embodiments of the disclosed technology. At 510, the method includes receiving, by a first network node, from a second network node, a third information. At 520, the method includes transmitting, by the first network node, a fourth information associated with one or more multicast broadcast service (MBS) sessions.

It will be appreciated that the present document discloses techniques that can be embodied in various embodiments to establish and manage multicast sessions in various scenarios. The disclosed and other embodiments, modules and the functional operations described in this document can be implemented in digital electronic circuitry, or in computer software, firmware, or hardware, including the structures disclosed in this document and their structural equivalents, or in combinations of one or more of them. The disclosed and other embodiments can be implemented as one or more computer program products, i.e., one or more modules of computer program instructions encoded on a computer readable medium for execution by, or to control the operation of, data processing apparatus. The computer readable medium can be a machine-readable storage device, a machine-readable storage substrate, a memory device, a composition of matter effecting a machine-readable propagated signal, or a combination of one or more them. The term "data processing apparatus" encompasses all apparatus, devices, and machines for processing data, including by way of example a programmable processor, a computer, or multiple processors or computers. The apparatus can include, in addition to hardware, code that creates an execution environment for the computer program in question, e.g., code that constitutes processor firmware, a protocol stack, a database management system, an operating system, or a combination of one or more of them. A propagated signal is an artificially generated signal, e.g., a machine-generated electrical, optical, or electromagnetic signal, that is generated to encode information for transmission to suitable receiver apparatus.

A computer program (also known as a program, software, software application, script, or code) can be written in any form of programming language, including compiled or interpreted languages, and it can be deployed in any form, including as a stand-alone program or as a module, component, subroutine, or other unit suitable for use in a computing environment. A computer program does not necessarily correspond to a file in a file system. A program can be stored in a portion of a file that holds other programs or data (e.g., one or more scripts stored in a markup language document), in a single file dedicated to the program in question, or in multiple coordinated files (e.g., files that store one or more modules, sub programs, or portions of code). A computer program can be deployed to be executed on one computer or on multiple computers that are located at one site or distributed across multiple sites and interconnected by a communication network.

The processes and logic flows described in this document can be performed by one or more programmable processors executing one or more computer programs to perform functions by operating on input data and generating output. The processes and logic flows can also be performed by, and apparatus can also be implemented as, special purpose logic circuitry, e.g., an FPGA (field programmable gate array) or an ASIC (application specific integrated circuit).

Processors suitable for the execution of a computer program include, by way of example, both general and special purpose microprocessors, and any one or more processors of any kind of digital computer. Generally, a processor will receive instructions and data from a read only memory or a random-access memory or both. The essential elements of a computer are a processor for performing instructions and one or more memory devices for storing instructions and data. Generally, a computer will also include, or be operatively coupled to receive data from or transfer data to, or both, one or more mass storage devices for storing data, e.g., magnetic, magneto optical disks, or optical disks. However, a computer need not have such devices. Computer readable media suitable for storing computer program instructions and data include all forms of non-volatile memory, media and memory devices, including by way of example semiconductor memory devices, e.g., EPROM, EEPROM, and flash memory devices; magnetic disks, e.g., internal hard disks or removable disks; magneto optical disks; and CD ROM and DVD-ROM disks. The processor and the memory can be supplemented by, or incorporated in, special purpose logic circuitry.

Some embodiments may preferably implement one or more of the following solutions, listed in clause-format. The following clauses are supported and further described in the Examples above and throughout this document. As used in the clauses below and in the claims, a wireless terminal may be user equipment, mobile station, or any other wireless terminal including fixed nodes such as base stations. A network node includes a base station including a next generation Node B (gNB), enhanced Node B (eNB), or any other device that performs as a base station. A resource range may refer to a range of time-frequency resources or blocks.

Clause 1. A method of wireless communication, comprising: receiving, by a first network node, from a second network node, a first information; and transmitting, by the first network node, a second information associated with one or more multicast broadcast service (MBS) sessions.

Clause 2. The method of clause 1, wherein the first information includes information that is associated with one or more multicast broadcast service (MBS) sessions.

Clause 3. The method of clause 1, wherein the second information includes a multicast broadcast service (MBS) session identity.

Clause 4. The method of clause 1, wherein, upon detecting an expiration of an inactivity timer, the second network node transmits, to the first network node, the first information associated with the at least one of the MBS sessions whose inactivity timer has expired.

Clause 5. The method of clause 4, wherein the first information includes at least one of an MBS session identity, information about the expiration of the inactivity timer.

Clause 6. The method of clause 1, wherein the second information includes at least one of an identity of the MBS session, a deactivation or suspension indication for the multicast broadcast service session, an identity of a multicast resource bearer (MRB, or a deactivation or suspension indication for the MRB.

Clause 7. The method of clause 1, wherein the second information includes an RRC container including a radio resource control (RRC) message.

Clause 8. The method of clause 7, wherein the RRC message includes at least one of an identity of the MBS session, a deactivation or suspension indication for the multicast broadcast service session, an identity of a multicast resource bearer (MRB), or a deactivation or suspension indication for the MRB.

Clause 9. The method of clause 1, wherein the second information includes at least one of an MBS session identity, a deactivation or suspension indication for the multicast broadcast service session.

Clause 10. The method of clause 1, wherein the first information includes a packet data convergence protocol (PDCP) downlink (DL) status.

Clause 11. The method of clause 1, wherein the second information includes at least one of an indication to inform the second network node that the MBS session is not deactivated, or an indication to request the second network node to ignore an expired inactivity timer, or an indication to request the second network node to restart the expired inactivity timer.

Clause 12. The method of clause 1, wherein, upon determining to deactivate the MBS session, retaining, by the first network node, multicast broadcast service information associated with the MBS session to be deactivated.

Clause 13. The method of clause 11, wherein the multicast broadcast service information includes at least one of F1 UL TEIDs, F1 DL TEIDs, F1 UL transport layer addresses, F1 DL transport layer addresses.

Clause 14. The method of clause 1, wherein the second network node receives inactivity timer configuration from the first network node via E1AP message.

Clause 15. The method of clause 14, wherein the second network receives one set of inactivity timer configuration.

Clause 16. The method of clause 14, wherein the inactive timer configuration is per MBS session.

Clause 17. The method of clause 14, wherein the second network receives two or more sets of inactivity timer configuration.

Clause 18. The method of clause 17, wherein the second network receives one or more MBS session identities for each set of inactivity timer configuration.

Clause 19. The method of clause 14, wherein 5GC transmits the inactivity timer configuration to the first network node via NGAP message.

Clause 20. The method of clause 19, wherein the first network receives one set of inactivity timer configuration.

Clause 21. The method of clause 19, wherein the inactive timer configuration is per MBS session.

Clause 22. The method of clause 19, wherein the first network receives two or more sets of inactivity timer configuration.

Clause 23. The method of clause 21, wherein the first network receives one or more MBS session identities for each set of inactivity timer configuration.

Clause 24. The method of clause 1, wherein the second information is transmitted to a distributed unit.

Clause 25. The method of clause 24, wherein the second information includes an indication in order to inform distributed unit to maintain context or configuration information related to the MBS session to be deactivated.

Clause 26. The method of clause 24, wherein the distributed unit generates a medium access control layer control element (MAC CE) to inform a wireless device of a deactivated logical channel.

Clause 27. The method of clause 24, wherein the distributed unit transmits the deactivated MBS session identity via a system information block (SIB) message or multicast control channel (MCCH).

Clause 28. The method of clause 24, wherein the distributed unit transmits a deactivation indication via a system information block (SIB) message or multicast control channel (MCCH).

Clause 29. The method of clause 1, wherein the second information is transmitted to 5GC.

Clause 30. The method of clause 29, wherein the second information includes an MBS session identity.

Clause 31. The method of clause 30, wherein the second information includes a deactivation indication.

Clause 32. The method of clause 30, wherein the second information includes a indication which reflects an inactivity timer for a MBS session is expired, or the first network nodes requests or decides to deactivate one or more MBS sessions.

Clause 33. The method of clause 1, wherein the first network node informs 5GC of its capability as to whether MBS session deactivation is supported.

Clause 34. The method of clause 1, wherein a distributed unit reports, to the first network node, its capability as to whether MBS session deactivation is supported.

Clause 35. The method of clause 1, wherein a distributed unit reports, to the first network node, its capability as to whether a deactivation of a multicast resource bearer (MRB) is supported.

Clause 36. The method of clause 1, wherein 5GC transmits, to the first network node, a list including the MBS sessions capable of being deactivated.

Clause 37. The method of clause 1, wherein the first network node transmits, to the second network node, a list including the MBS sessions capable of being deactivated.

Clause 38. A method of wireless communication, comprising: receiving, by a first network node, from a second network node, a third information; and transmitting, by the first network node, a fourth information associated with one or more multicast broadcast service (MBS) sessions.

Clause 39. The method of clause 38, wherein the third information includes information that is associated with one or more multicast broadcast service (MBS) sessions.

Clause 40. The method of clause 38, wherein the third information includes at least one of an MBS session identity, information to indicate the first network node the detection of DL data arrival for the MBS session.

Clause 41. The method of clause 38, wherein the fourth information includes at least one of an identity of the MBS session, an activation indication for the MBS session, an identity of a multicast resource bearer (MRB), an activation indication for the MRB.

Clause 42. The method of clause 38, wherein the fourth information includes an RRC container including a radio resource control (RRC) message.

Clause 43. The method of clause 42, wherein the RRC message includes at least one of an identity of the MBS session, an activation indication for the MBS session, an identity of the multicast resource bearer (MRB), an activation indication for the MRB.

Clause 44. The method of clause 38, wherein the fourth information is transmitted to a distributed unit.

Clause 45. The method of clause 44, wherein the distributed unit generates a medium access control layer control element (MAC CE) to inform a wireless device of an activated logical channel.

Clause 46. The method of clause 44, wherein the distributed unit transmits the activated MBS session identity via a system information block (SIB) message or multicast control channel (MCCH).

Clause 47. The method of clause 44, wherein the distributed unit transmits an activation indication via a system information block (SIB) message or multicast control channel (MCCH).

Clause 48. The method of clause 38, wherein the fourth information includes at least one of F1 DL TEIDs or F1 DL transport layer addresses.

Clause 49. The method of clause 38, wherein the fourth information includes at least one of an identity of the MBS session, an activation indication.

Clause 50. The method of clause 38, wherein the fourth information is transmitted to 5GC.

Clause 51. The method of clause 50, wherein the fourth information includes an MBS session identity.

Clause 52. The method of clause 50, wherein the fourth information includes an activation indication.

Clause 53. The method of clause 50, wherein the fourth information includes an indication which indicates that the first network node requests/decides to activate one or more MBS sessions.

Clause 54. The method of any of clauses 50-53, wherein the 5GC transmits an MBS session identity.

Clause 55. The method of clause 50, wherein the 5GC transmits, to the first network node, an activation indication.

Clause 56. The method of clause 38, wherein the first network node informs 5GC of its capability as to whether MBS session activation is supported.

Clause 57. The method of clause 38, wherein a distributed unit reports, to the first network node, its capability as to whether MBS session activation is supported.

Clause 58. The method of clause 38, wherein a distributed unit reports, to the first network node, its capability as to whether an activation of a multicast resource bearer (MRB) is supported.

Clause 59. The method of clause 38, wherein 5GC transmits, to the first network node, a list including the MBS sessions capable of being activated.

Clause 60. The method of clause 38, wherein the first network node transmits, to the second network node, a list including the MBS sessions capable of being activated.

Clause 61. The method of any of clauses 1-58, wherein the first network node includes a centralized unit control plane (CU-CP), and the second network node includes a centralized unit user plane (CU-UP).

Clause 62. An apparatus for wireless communication, comprising a memory and a processor, wherein the processor reads code from the memory and implements a method recited in any of clauses 1 to 61.

Clause 63. A computer readable program storage medium having code stored thereon, the code, when executed by a processor, causing the processor to implement a method recited in any of clauses 1 to 61.

While this patent document contains many specifics, these should not be construed as limitations on the scope of any invention or of what may be claimed, but rather as descriptions of features that may be specific to particular embodiments of particular inventions. Certain features that are described in this patent document in the context of separate embodiments can also be implemented in combination in a single embodiment. Conversely, various features that are described in the context of a single embodiment can also be implemented in multiple embodiments separately or in any suitable subcombination. Moreover, although features may be described above as acting in certain combinations and even initially claimed as such, one or more features from a claimed combination can in some cases be excised from the combination, and the claimed combination may be directed to a subcombination or variation of a subcombination.

Similarly, while operations are depicted in the drawings in a particular order, this should not be understood as requiring that such operations be performed in the particular order shown or in sequential order, or that all illustrated operations be performed, to achieve desirable results. Moreover, the separation of various system components in the embodiments described in this patent document should not be understood as requiring such separation in all embodiments.

Only a few implementations and examples are described, and other implementations, enhancements and variations can be made based on what is described and illustrated in this patent document.

What is claimed is:

1. A method of wireless communication, comprising:

receiving, by a first network node comprising a centralized unit control plane (CU-CP), from a second network node comprising a centralized unit user plane (CU-UP), a first information comprising information associated with at least one of one or more multicast broadcast (MBS) sessions or information about an expiration of an inactivity timer; and transmitting, by the first network node to a third network node comprising a distributed unit, a second information associated with the one or more MBS sessions, the second information including at least one of an identity of the one or more MBS sessions, a deactivation or suspension indication for the one or more MBS sessions, an identity of a multicast resource bearer (MRB), or a deactivation or suspension indication for the MRB, the second information further including an indication to inform the third network node that an MBS session of the one or more MBS sessions is not deactivated.

2. The method of claim 1, wherein the first information includes information that is associated with one or more MBS sessions.

3. The method of claim 1, wherein the second information includes an MBS session identity.

4. The method of claim 1, wherein, the first network node receives the first information from the second network node, responsive to the second network node upon detecting the expiration of the inactivity timer, the first information associated with at least one of the one or more MBS sessions whose inactivity timer has expired.

5. The method of claim 4, wherein the first information includes at least one of an MBS session identity, or information about the expiration of the inactivity timer.

6. The method of claim 1, wherein the second information includes a radio resource control (RRC) container including an RRC message.

7. The method of claim 6, wherein the RRC message includes at least one of an identity of the one or more MBS sessions, a deactivation or suspension indication for the one or more MBS sessions, an identity of a multicast resource bearer (MRB), or a deactivation or suspension indication for the MRB.

8. The method of claim 1, wherein the first information includes a packet data convergence protocol (PDCP) downlink (DL) status.

9. The method of claim 1, wherein the second information further includes at least one of an indication to request the third network node to ignore an expired inactivity timer, or an indication to request the third network node to restart the expired inactivity timer.

10. The method of claim 1, wherein, upon determining to deactivate an MBS session of the one or more MBS sessions, retaining, by the first network node, multicast broadcast service information associated with the MBS session to be deactivated.

11. The method of claim 10, wherein the multicast broadcast service information includes at least one of F1 uplink (UL) tunnel endpoint identifiers (TEIDs), F1 downlink (DL) TEIDs, F1 UL transport layer addresses, or F1 DL transport layer addresses.

12. The method of claim 1, wherein the first network node transmits inactivity timer configuration to the second network node via E1AP message.

13. The method of claim 12, wherein the first network node transmits one set of inactivity timer configuration.

14. The method of claim 12, wherein the inactive timer configuration is per MBS session.

15. The method of claim 12, wherein the first network node transmits two or more sets of inactivity timer configuration.

16. A method of wireless communication, comprising:

sending, by a second network node comprising a centralized unit user plane (CU-UP) to a first network node comprising a centralized unit control plane (CU-CP), a first information comprising information associated with at least one of one or more multicast broadcast (MBS) sessions or information about an expiration of an inactivity timer, wherein the first network node transmits to a third network node comprising a distributed unit, a second information associated with the one or more MBS sessions, the second information including at least one of an identity of the one or more MBS sessions, a deactivation or suspension indication for the one or more MBS sessions, an identity of a multicast resource bearer (MRB), or a deactivation or suspension indication for the MRB, the second information further including an indication to inform the third network node that an MBS session of the one or more MBS sessions is not deactivated.

17. A first network node comprising a centralized unit control plane (CU-CP), the first network node comprising:

at least one processor configured to:

receive, via a transceiver, from a second network node comprising a centralized unit user plane (CU-UP), a first information comprising information associated with at least one of one or more multicast broadcast (MBS) sessions or information about an expiration of an inactivity timer; and transmit, via the transceiver to a third network node comprising a distributed unit, a second information associated with the one or more MBS sessions, the second information including at least one of an identity of the one or more MBS sessions, a deactivation or suspension indication for the one or more MBS sessions, an identity of a multicast resource bearer (MRB), or a deactivation or suspension indication for the MRB, the second information further including an indication to inform the third network node that an MBS session of the one or more MBS sessions is not deactivated.

18. A second network node comprising a centralized unit user plane (CU-UP), comprising:

at least one processor configured to:

send, via a transmitter, to a first network node comprising a centralized unit control plane (CU-CP), a first information comprising information associated with at least one of one or more multicast broadcast (MBS) sessions or information about an expiration of an inactivity timer, wherein the first network node transmits to a third network node comprising a distributed unit, a second information associated with the one or more MBS sessions, the second information including at least one of an identity of the one or more MBS sessions, a deactivation or suspension indication for the one or more MBS sessions, an identity of a multicast resource bearer (MRB), or a deactivation or suspension indication for the MRB, the second information further including an indication to inform the third network node that an MBS session of the one or more MBS sessions is not deactivated.

* * * * *